United States Patent [19]

Matsumoto et al.

[11] 3,851,153

[45] Nov. 26, 1974

[54] MAGNETIC CARD

[76] Inventors: Shigeharu Matsumoto, 9-2 Iidakashi 3 Chome, 9-2 Iidakashi 3-chome; Eiji Matsumoto, 4-6 Fujimi 2-chome, both of Chiyoda-ku, Tokyo, Japan

[22] Filed: Mar. 12, 1973

[21] Appl. No.: 339,973

[30] Foreign Application Priority Data

Mar. 16, 1972 Japan ................................ 47-27025

[52] U.S. Cl. ........ 235/61.12 M, 360/2, 235/61.12 C

[51] Int. Cl.... G11b 25/04, G06k 19/08, G06k 7/06

[58] Field of Search............. 235/61.12 R, 61.12 M, 235/61.12 N, 61.11 D, 61.11 A, 61.12 C, 61.7 B; 340/174 JA; 179/100.2 A; 40/2.2; 360/2

[56] References Cited

UNITED STATES PATENTS

| | | | |
|---|---|---|---|
| 2,353,061 | 7/1944 | Oldenboom | 235/61.12 C |
| 3,115,581 | 12/1963 | Kilby | 235/61.12 R |
| 3,134,254 | 5/1964 | Richard | 235/61.12 C |
| 3,644,716 | 2/1972 | Nagata | 235/61.12 M |
| 3,712,973 | 1/1973 | Karl | 235/61.11 R |

*Primary Examiner*—Daryl W. Cook
*Assistant Examiner*—Robert M. Kilgore
*Attorney, Agent, or Firm*—William Anthony Drucker

[57] ABSTRACT

A magnetic card is adapted to insert into an input port on a terminal device of a computer and has a conductor to form a portion of an electric circuit of the terminal device.

7 Claims, 5 Drawing Figures

PATENTED NOV 26 1974

3,851,153

MAGNETIC CARD

The present invention relates to a card and more particularly to a magnetic card in which a contact portion is included so as to form a portion of an electric circuit of a terminal device of a computer thereby preventing its illegal use.

Remarkable development of the computer in the recent years has also involved development of magnetic cards as input means thereto. Such a magnetic card is made to combine with an identification card and is widely utilized as a shopping card or a bank deposit card for its high reliability. In this case, on a surface of the magnetic card is indicated name, issued date or the term of validity and are stored therein the account number, the cord of the branch office of bank, the amount of deposit, the secret number or the like by magnetic system.

However, according to the course of years, there has become to occur accidents by use of a false card of the magnetic card generally propagated. The magnetic card is generally used by inserting into an input port on a terminal device of a computer system. Such a terminal device is constructed to begin the operation by the insertion of the magnetic card, that is, by this insertion of the magnetic card, the terminal device closes its electric circuit for utilizing the mechanical effect, the light interrupting effect or the like through the card. Accordingly, the terminal device is easily actuated by a false card which has a dimension being capable of insertion into the input port thereof. Furthermore, in the terminal device, there is an inconvenience that the card permits an illegal use when a false magnetic memory is stored in the magnetic card by any false method. That is, since the operation of the terminal device is effected by the insertion of the magnetic card, as mentioned above, if the latter is elaborately forged and false informations are memorized, the terminal device is actuated by the insertion of the forged card and as a result, great disadvantages occur to the true holder of the magnetic card. Similarly, if the terminal device is actuated by such false informations, confusion might occur in processing of the computer system whereby the computer will not actuate.

To solve the above defect and disadvantages, one object of the present invention is to provide a magnetic card which includes a conductor to form a portion of an electric circuit of a terminal device when the card is inserted into an input port of the terminal device.

Another object of the present invention is to provide a magnetic card which includes a conductor having a resister circuit with proper resistance values.

A further object of the present invention is to provide a magnetic card which includes a conductor having a resistor circuit formed by a printed wiring executed to an inner portion of the magnetic card or an outer surface thereof.

Still another object of the present invention is to provide a magnetic card which includes a conductor having a resistor circuit whereby the position and value of the magnetic card is detected when the card is inserted into the desired device and true or false distinction of a card is quickly sensed.

According to a magnetic card of the present invention, the card comprises a base plate and a conductor fixed to the base plate and having a plurality of terminals. In this case, the conductor is preferably constituted by a printed wiring but, for example, the electric circuit may be constituted by staking good conductor, such as a copper foil, a copper plate, a copper wire or the like, or by forming an ink having conductivity obtained by mixing conductive metal powder of, for example, copper in binder.

These and other objects of the present invention will become readily apparent from the following detailed description thereof when taken together with the accompanying drawings. In the drawings, like reference numerals are employed to designate like parts throughout the same.

Figure 1:
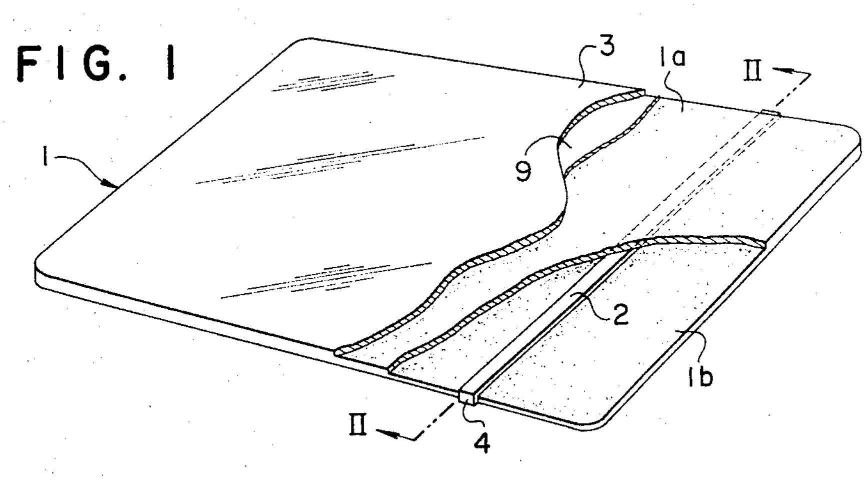
FIG. 1 shows a perspective view of a magnetic card according to the present invention.
Figure 3:
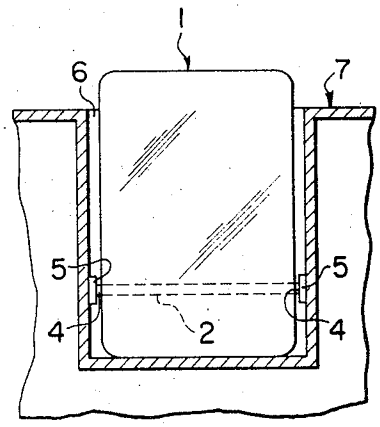
FIG. 3 is a schematic view showing the relationship between the magnetic card according to the invention and a terminal device.
Figure 2:
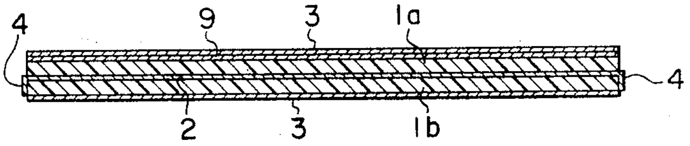
FIG. 2 is a section view of the magnetic card taken along the line 2—2 of FIG. 1.

Referring to FIGS. 1 to 3, a magnetic card is illustrated by 1, and reference numerals 1a and 1b denote relatively thick base plates of synthetic resin. A conductor 2 is formed by means of printed wiring on one or both surfaces of the plates and a binding agent is applied on the surfaces so as to bond in overlapping the base plates 1*a* and 1*b*. The plates 1a and 1b contain prints of letters, characters, photographs or the like in one surface or both surfaces and in its desired position so as to constitute a desired card. Further, a magnetic layer 9 is formed on any surface of the base plates. Since the magnetic layer is well known and is not the direct subject of the present invention, it is not explained in detail, but it is ordinarily formed by applying magnetic ink. Applied on the base plates 1a and 1b is a transparent coating layer or a layer 3 of transparent synthetic resin film attached by heat pressing manner. Reference numeral 4 shows terminals which are connected to both ends of the conductor 2 and which is provided to protrude on sides of the base plates 1a and 1b. In this case, the terminals 4 may be modified to correspond to the stucture and configuration of contacts 5 provided in a card input port 6 of a terminal device 7. The card 1 is inserted into the card input port 6 of the terminal device 7, as shown in FIG. 3. The contacts 5 provide within the card input port 6 and the conductor 2 of the card 1 is fixed at a position to correspond to the contacts 5. In the drawings, although the contacts 5 of the terminal device and the conductor 2 of the card are aligned, alternation of the arrangement thereof is possible. Accordingly, a computer system is actuated through the terminal device 7 only when the card 1 is inserted into the card input port 6 of the terminal device 7 and is in contact with the contacts 5.

Figure 4:
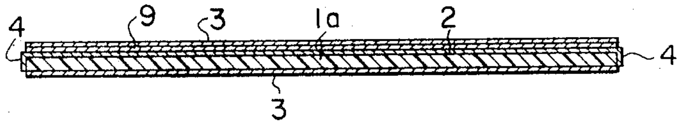
FIG. 4 is a sectional view showing in a similar manner to FIG. 2 a modification according to the present invention.

FIG. 4 illustrates one embodiment which is very similar to the card shown in FIG. 1 but is different somewhat from it. A conductor 2 is constituted by a printed wiring on a surface of a base plate 1*a*. Further, desired letters, characters, photographs, magnetic records or the like are executed on the base plate 1a so as to constitute a desired card. Provied on both surfaces of the base plate 1a is a transparent coating layer or a layer 3 of transparent synthetic resin film attached by heat pressing manner. Reference numerals 4 are terminals being similar to the embodiment shown in FIG. 1.

Figure 5:
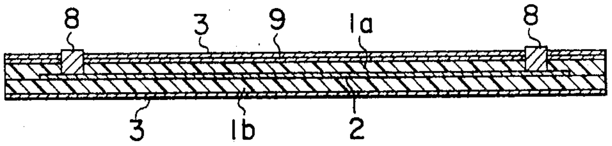
FIG. 5 is a sectional view of a further modification according to the invention.

Shown in FIG. 5 is a further card according to the present invention. In this embodiment, a conductor 2 is formed by a printed wiring on one surface of any one of base plates 1*a* and 1*b* and extends up to a position not to protrude from both ends of the base plates. Conductible contacts are constituted by embedding terminals 8 in the base plates and the coating layer or the layer of transparent synthetic resin film and by contacting with the conductor 2 in its bottom. In this embodiment, the terminals 8 is protruding on one side of the base plates, but these may protrude on both sides of the latter. Moreover, the terminals are described for two throughout each embodiment, but there is no limitation in case of two or more terminals.

In the above mentioned embodiments, since the subject matter of the present invention resides in a conductor 2, that is, terminals formed at a desired position of the magnetic card, when the magnetic card 1 is inserted into the input port 6 on the terminal device 7 of the computer system (not shown) the terminals are connected to the computer system. Accordingly, the truth or imitation of the card inserted into the terminal device may be ascertained. To further assure the ascertaining function, the conductor 2 formed on the base plates 1a and 1b according to the present invention may have a desired value of resistance whereby if the inserted card 1 is not true, the computer which is adapted to actuate by connection of the desired value of resistance at a desired position is not actuated by the false card. Although the present invention has been described as one to actuate the computer system by the insertion of the magnetic card, throughout the embodiments described above, the present invention is not limited only to it. For example, it may be used in any device for detecting the resistance value of the magnetic card or in any device for ascertaining a true or false card.

As understood from the above description, there is an advantage according to the present invention that accidents by the use of the false card may be avoided because the forging of the wiring and resistance value preset on the card is very difficult.

What is claimed is:

1. A thin identification type card or the like for operation with a terminal device having contacts therein comprising: a substrate of plastic sheet material; indicia printed on said substrate; a magnetic layer on said substrate; a verification conductor having a pair of terminals on said substrate, said conductor terminals being disposed to align with contacts in said terminal device; and means connected to said terminal device responsive to said magnetic layer.

2. A magnetic card according to claim 1, wherein said conductor is constituted by a printed wiring at a desired position of said base plate.

3. A magnetic card according to claim 1, wherein said conductor comprises a resistor having a desired value.

4. A magnetic card according to claim 1, wherein said conductor has a desired value of resistance corresponding to a resistance value preset in a terminal device.

5. A magnetic card according to claim 1, wherein said conductor is fixed to said base plate and said terminals of said conductor is constituted to protrude from both sides of said base plate.

6. A magnetic card according to claim 1, wherein said conductor is arranged on said base plate so as not to protrude from both ends of said base plate and said terminals are embedded in said base plate as conductible contacts.

7. A magnetic card according to claim 1, further comprising a transparent coating layer on a surface of said base plate or a layer of transparent synthetic resin film attached by heat pressing manner on said surface of said base plate.

* * * * *